United States Patent
Blankenburg et al.

(10) Patent No.: US 10,225,377 B2
(45) Date of Patent: Mar. 5, 2019

(54) PROTOCOL TRANSLATION WITH DELAY

(71) Applicant: Microsoft Technology Licensing, LLC, Redmond, WA (US)

(72) Inventors: Garrett Blankenburg, Redmond, WA (US); Michael Duggan, Redmond, WA (US); Andres Hernandez, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 3 days.

(21) Appl. No.: 15/423,502

(22) Filed: Feb. 2, 2017

(65) Prior Publication Data

US 2018/0034943 A1 Feb. 1, 2018

Related U.S. Application Data

(60) Provisional application No. 62/368,908, filed on Jul. 29, 2016.

(51) Int. Cl.
| | |
|---|---|
| *H04L 29/00* | (2006.01) |
| *H04B 10/114* | (2013.01) |
| *H04L 29/06* | (2006.01) |
| *G08C 23/04* | (2006.01) |
| *H04W 4/80* | (2018.01) |
| *H04N 5/44* | (2011.01) |
| *H04N 21/422* | (2011.01) |

(52) U.S. Cl.
CPC .............. *H04L 69/08* (2013.01); *G08C 23/04* (2013.01); *H04W 4/80* (2018.02); *G08C 2201/90* (2013.01); *H04N 5/4403* (2013.01); *H04N 21/42221* (2013.01); *H04N 2005/4426* (2013.01)

(58) Field of Classification Search
CPC .................. H04L 69/08; H04B 10/11–10/116
See application file for complete search history.

(56) References Cited

U.S. PATENT DOCUMENTS

| | | | |
|---|---|---|---|
| 5,479,408 A | 12/1995 | Will | |
| 5,886,647 A | 3/1999 | Badger et al. | |
| 6,111,677 A * | 8/2000 | Shintani | H04B 10/114 340/12.22 |
| 6,724,442 B1 | 4/2004 | Zyskowski et al. | |

(Continued)

OTHER PUBLICATIONS

"International Search Report and Written Opinion Issued in PCT Application No. PCT/US2017/042966", dated Dec. 13, 2017, 13 Pages.

(Continued)

*Primary Examiner* — Nathan M Cors
(74) *Attorney, Agent, or Firm* — Rainier Patents, P.S.

(57) ABSTRACT

This document relates to protocol translation for remote control of various devices. One example is a technique that includes identifying a controlled device that has a controlled device communication protocol for controlling the controlled device. The technique also includes obtaining translation data that conveys translations of commands from another protocol into the controlled device protocol. The technique also includes configuring a delay for transmitting the translated commands, and performing translation between the another protocol and the controlled device protocol using the translation data and the configured delay.

21 Claims, 8 Drawing Sheets

(56) References Cited

U.S. PATENT DOCUMENTS

| | | |
|---|---|---|
| 6,769,129 B1 | 7/2004 | Perlman |
| 6,864,778 B2 | 3/2005 | Musschebroeck et al. |
| 7,266,301 B2 | 9/2007 | Stanchfield et al. |
| 7,450,852 B2 | 11/2008 | Calhoon |
| 7,668,503 B1 | 2/2010 | Schumann et al. |
| 8,134,649 B2 | 3/2012 | Rogers |
| 9,135,814 B2 | 9/2015 | Walrant et al. |
| 2002/0110146 A1* | 8/2002 | Thayer .................. G07C 5/008 370/465 |
| 2003/0020645 A1 | 1/2003 | Akiyama |
| 2003/0195969 A1* | 10/2003 | Neuman ............. H04L 12/2803 709/229 |
| 2004/0160338 A1 | 8/2004 | Maxson et al. |
| 2007/0003289 A1* | 1/2007 | Tan .................... H04B 10/1127 398/164 |
| 2008/0028430 A1* | 1/2008 | Kreiner ................ H04N 5/4403 725/78 |
| 2010/0053465 A1 | 3/2010 | Rogers |
| 2012/0087671 A1* | 4/2012 | Eber ................... H04B 10/1143 398/106 |
| 2015/0100163 A1* | 4/2015 | Allmaras ............. F24F 11/0009 700/276 |
| 2016/0238588 A1* | 8/2016 | Sams ................... A61B 5/0015 |

OTHER PUBLICATIONS

"TNP Wireless IR Extender Repeater—Universal Remote Control Infrared IR Transmitter and Receiver with 3 Head Eye IR Blaster Emitter Booster Cable Supports Long Range 600FT", retrieved at <<https://www.selloscope.com/bez/TNP-Wireless-IR-Extender-Repeater-Universal-Remote-Co/B01I9CXYE4>>, on Nov. 17, 2016, 13 pages.

"Implementing an IR Blaster on HCS08-Based IEEE 802.15.4 Wireless Nodes", retrieved at <<https://cache.freescale.com/files/rf_if/doc/app_note/AN4152.pdf>>, on Nov. 17, 2016, 22 pages.

* cited by examiner

Method 700

PROTOCOL TRANSLATION WITH DELAY

BACKGROUND

Different types of electronic devices can be controlled remotely by other devices, and sometimes different devices use different protocols. As a consequence, an electronic device may sometimes receive a command in a protocol that the device cannot properly interpret. In some cases, receiving such a command can cause the electronic device to exhibit unexpected behavior.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The description generally relates to protocol translation for remote control of various devices. One example is a computing device that can include an infrared receiver, an infrared transmitter, a processing unit configured to execute an operating system, and a microcontroller. The microcontroller can be configured to receive a first command in a first protocol via the infrared receiver and provide the first command to the operating system. The operating system can be configured to obtain the first command from the microcontroller, translate the command into a translated second command in a second protocol, and provide the translated second command to the microcontroller. The microcontroller can also be configured to delay for a specified period of time after receiving the translated second command from the operating system and, after expiration of the specified period of time, control the infrared transmitter to transmit the translated second command.

Another example is a computing device that can include a receiver, a transmitter, processing resources, and memory or storage resources. The memory or storage resources can store instructions which, when executed by the processing resources, cause the processing resources to receive, via the receiver, a first packet that identifies a command encoded in a first protocol. The instructions, when executed by the processing resources, can also cause the processing resources to translate the first packet into a second packet identifying the command in a second protocol, initiate a timer, and, responsive to expiration of the timer, cause the transmitter to transmit the second packet.

Another example is a method that can include identifying a controlled device that has a controlled device communication protocol for controlling the controlled device. The method can also include obtaining translation data for the controlled device, and the translation data can convey translations of commands from another protocol into the controlled device protocol. The method can also include configuring a delay for transmitting the translated commands and performing translation between the another protocol and the controlled device protocol using the translation data and the configured delay.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

DETAILED DESCRIPTION

Overview

Figure 1:
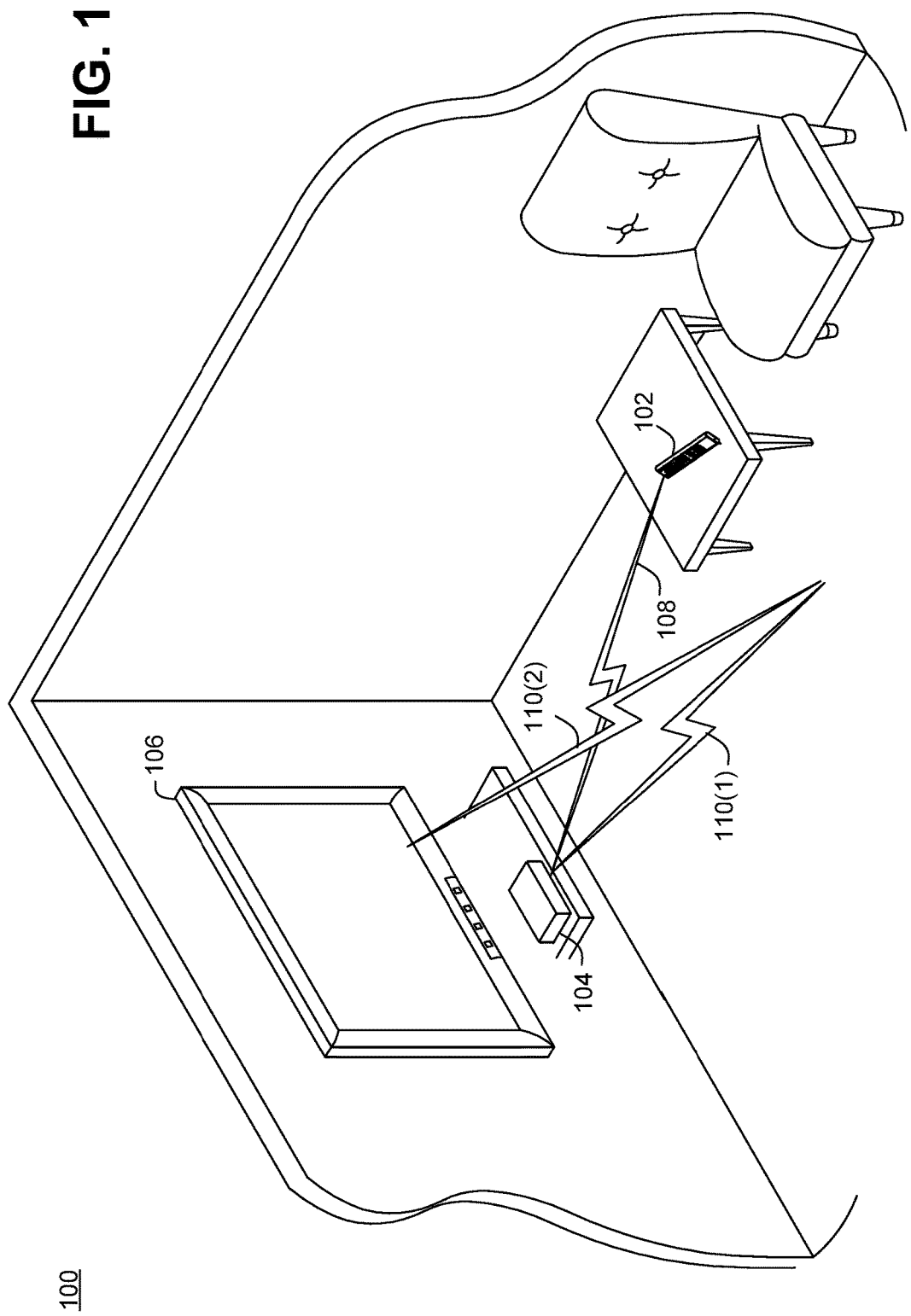
FIGS. 1 and 6 illustrate exemplary systems, consistent with some implementations of the present concepts.

Different types of devices can be controlled by remote controls that implement different protocols. For example, two different brands of televisions might use different infrared protocols for controlling the televisions. As a consequence, the remote control for one television might not work for another television because commands that the remote control transmits may not be compliant with the protocol for the other television.

In addition, sometimes an intermediary computing device, such as a gaming console, might be deployed to control another device, such as a television. To do so, the gaming console might have a corresponding remote control that directly controls the gaming console. After receiving the commands from the remote control, the gaming console can then retransmit the commands to the television.

In this scenario, the gaming console and the television might use different remote control protocols. However, assuming both the gaming console and the television use similar portions of the electronic spectrum (e.g., both use infrared protocols or similar radio frequencies), then both the gaming console and the television may detect signals transmitted by the remote control that can only be properly translated by the console. Because these signals conform to the protocol for the gaming console instead of the protocol for the television, the television might interpret the signal as a malformed communication. This, in turn, can cause the television to cease detection functionality for some time before the television is ready to receive another signal. If the television remains in the inactive detection state when the gaming console retransmits a translated command to the television, the television is unlikely to respond properly to the retransmitted command.

More generally, the disclosed implementations discuss various intermediary devices, such as the aforementioned console, that perform command translation. The command translation can be implemented for commands received from a remote control and intended to control a controlled device, such as the aforementioned television. This translation functionality can allow a user to control the controlled device using a remote control that cannot directly communicate with the controlled device, e.g., because the controlled device does not natively understand the protocol used by the remote control.

The examples introduced in the following discussion convey certain inventive concepts using infrared signaling examples. These examples are provided in the context of a gaming console that is used to control a display device, such as a television. However, the concepts discussed herein are also applicable in other contexts. For example, the disclosed implementations can be employed for control protocols using other forms of light (e.g., laser, ultraviolet, etc.), radio, sound, or other signaling mechanisms. In addition, the disclosed implementations can use directed or omnidirectional signals in free space, as well as signals carried via a physical conduit (e.g., fiber optic, power line communications, etc.). The disclosed implementations can be employed over a range of distances. For example, the disclosed implementations can be used to control devices for near-field computing purposes (e.g., devices within a few inches of one another), devices within the same room or building, and/or devices that are separated by many miles.

First Example System

FIG. 1 shows a system 100 with a remote control 102, a console 104 (e.g., a gaming console such as an XBox®), and a display 106 (e.g., a television, computer monitor, etc.). In some implementations, the remote control may be a remote control specifically for the console, and may be configured to transmit infrared signals in a first protocol that uses first commands understood by the console (e.g., NEC protocol or a variant thereof). The display 106 can be configured to process infrared signals in a second protocol that is different than the first protocol (e.g., a proprietary protocol associated with a manufacturer of the display, or any protocol other than the protocol understood by the console). The second protocol may use different commands than the first protocol. In addition, note that the remote control can, in some cases, be provided with the console by a manufacturer of the console, e.g., as a gaming controller or as a separate media remote used for controlling television, movies, music, etc.

As a consequence of using different protocols, the display 106 may not be able to directly process or respond to commands transmitted by the remote control 102. To allow the display to be controlled by the remote control, the remote control can transmit an infrared signal 108 conveying a first command to console 104 in the first infrared protocol (e.g., the "remote protocol"). In turn, the console can translate the command into a translated second command in the second infrared protocol (e.g., the "display protocol") and transmit an infrared signal 110(1) conveying the translated second command. Infrared signal 110(1) can reflect as infrared signal 110(2) and, in turn, be received by the display. Thus, the translation and retransmission by the console can allow the remote control to control the display by using the console as an intermediary. Note that infrared signals 110(1) and 110(2) may be referred to herein more generally as infrared signal 110, as it should be apparent from context whether the intent is to refer to infrared signal 110(1), 110(2), or both.

Note that the respective protocols and commands discussed herein can differ in various ways. For example, in some cases, the remote protocol and the display protocol can both define a similar set of logical commands, e.g., volume up, volume down, channel up/down, brightness/contrast up/down, etc. However, these commands can be represented differently in the different protocols.

For example, the commands in one protocol may be conveyed using a different number of bits than in the other protocol. As another example, different protocols may use packets with different headers or other data fields, including fields that identify the command, the intended recipient of the command (e.g., an identifier of the console and/or display), etc. In addition, one protocol may use different timing parameters for individual bits, e.g., some protocols may use the same duration of time to represent a logical 1 and a logical 0, e.g., 2 milliseconds for each. Other protocols may use a shorter period of time for one logical value than for another, e.g., 1.125 milliseconds for a logical 0 and 2.25 milliseconds for a logical 1. Protocols can also differ in specific light, radio, or sonic frequencies used, types of multiplexing (e.g., time vs. frequency division), use of guard channels or uplink/downlink channels, etc.

As used herein, the term "translate" implies obtaining a logical command in one protocol and conveying a similar logical concept in another protocol. For example, a first volume up command in the remote protocol might be translated into a second volume up command for the display protocol that has one or more different individual bits than the first volume up command, is of a different length than the first volume up command, is conveyed using a different frequency than the first volume up command, using different timing than the first volume up command, etc. Note also that the protocols need not be completely different, e.g., the two protocols may share some characteristics. For example, one protocol might be a new or extended version of the other protocol that may be somewhat compatible with the previous version, but that also defines new messages and/or deprecates some commands from the previous version.

Example Console

Figure 2:
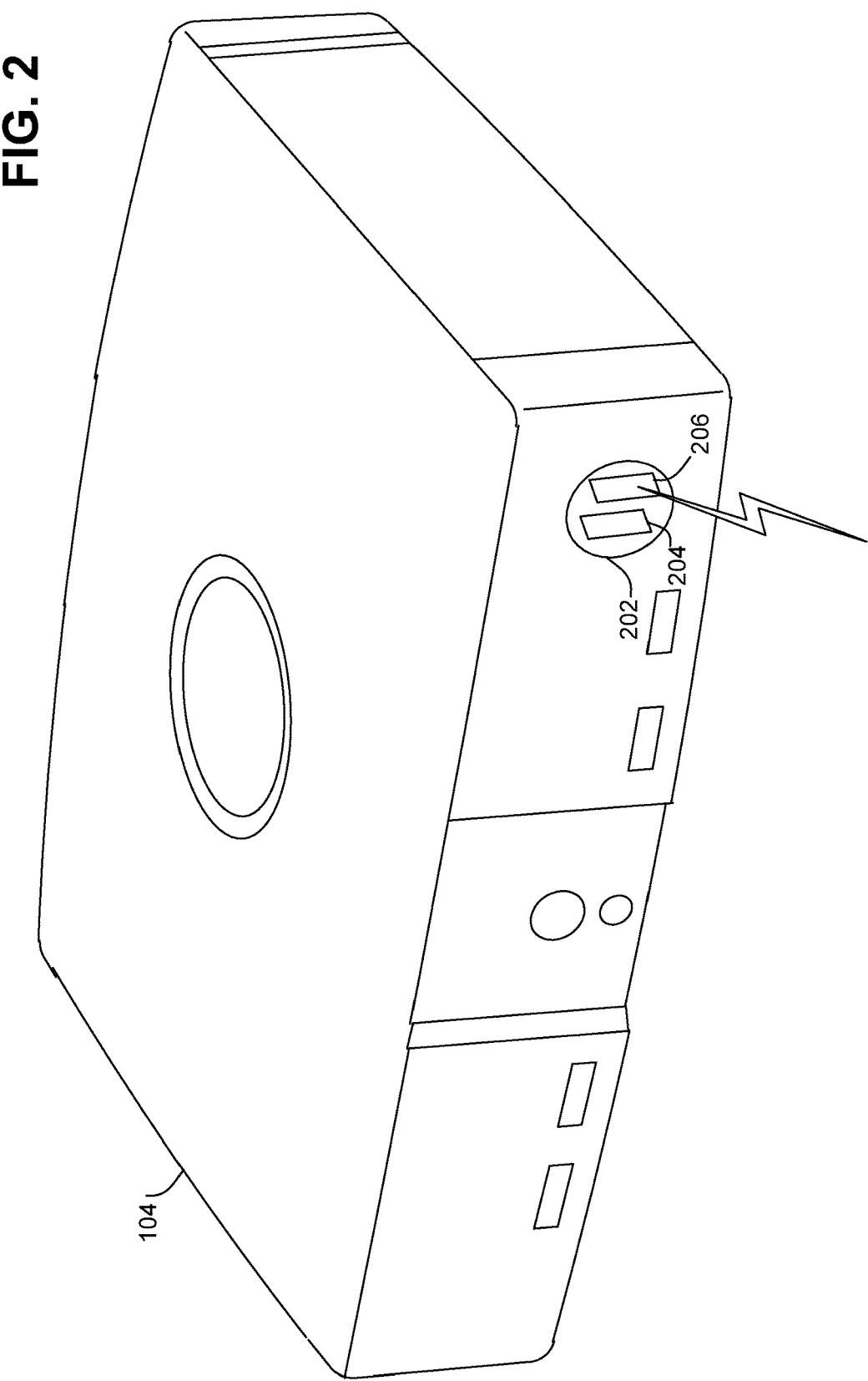
FIGS. 2, 4, and 5 illustrate exemplary computing devices, consistent with some implementations of the present concepts.

FIG. 2 shows console 104 in more detail. As shown, console 104 includes an infrared window 202, and behind the infrared window is an infrared receiver 204 and an infrared transmitter 206. In some cases, the infrared receiver and transmitter can be controlled by a single microcontroller within the console, e.g., responsive to commands provided by a processing unit (e.g., a CPU) of the console. In other implementations, the infrared receiver and transmitter can be controlled by separate microcontrollers.

Generally, the infrared receiver 204 can decode the infrared signal 108 transmitted by remote control 102 and provide the processing unit of the console 104 with a decoded infrared packet (e.g., a series of logical bits) conveying a command for the display 106. The processing unit can translate the command into the second protocol to obtain a translated second packet. The processing unit can then provide a translated packet (e.g., a series of logical bits) to the infrared transmitter 206 to retransmit as infrared signal 110, which in turn conveys the command to the display.

Note that infrared window 202 can be a single window shared by both the infrared receiver 204 and the infrared transmitter 206. The window can include an infrared band-pass filter that allows infrared light to pass through while attenuating visible light. Moreover, the infrared window can be relatively small, e.g., a few square inches (e.g., 5) or less (e.g., approximately one square inch). In some cases, the infrared transmitter will transmit at relatively high power, e.g., approximately ½ watt. The remote control 102 may transmit at a relatively lower power, e.g., an order of magnitude (e.g., 10×) less than the infrared transmitter on the console 104. Generally, this is possible because the remote control can have a line of sight to the console, whereas the infrared transmitter on the console may not have a direct line of sight to the display 106. Instead, the infrared transmitter on the console can transmit a relatively high-wattage signal 110(1) that can reflect off various surfaces (e.g., the floor, walls, etc.) and still carry enough energy to effectively communicate with the display 106.

In some implementations, the infrared transmitter 206 is pointed at a downward angle relative to a horizontal plane defined by the top surface or bottom surface of the console 104, e.g., 45 degrees or thereabouts. As a consequence, when the console is mounted in a relatively horizontal configuration, infrared signal 110(1) will tend to bounce off of the floor and then back to the display 106.

In some cases, the display 106 can detect the infrared signal 108 transmitted by the remote control 102. However, as noted, signal 108 may be in a protocol understood by the console 104 instead of another protocol natively understood by the display. As a consequence, the display may not be able to directly interpret some or all commands conveyed by the signal 108. Moreover, the display may temporarily cease detection functionality for a period of time while attempting to decode the signal 108. In other words, the display may temporarily transition to a non-detecting state for a short period of time that may extend past the time when the display stops detecting signal 108. For example, in some cases, the display may take about 250 milliseconds after detecting that signal 108 has ceased before being ready to detect another infrared signal.

If the console 104 retransmits signal 110 after signal 108 stops transmitting but while the display 106 remains in the non-detecting state, then the display may not detect or respond to the signal 110. This can be problematic and frustrating for a user, because the display may appear to be relative unresponsive. Generally, the disclosed implementations may use various techniques to ensure that the display has returned to an active detection state when the signal 110 is transmitted by the console.

Example Protocols

Figure 3:
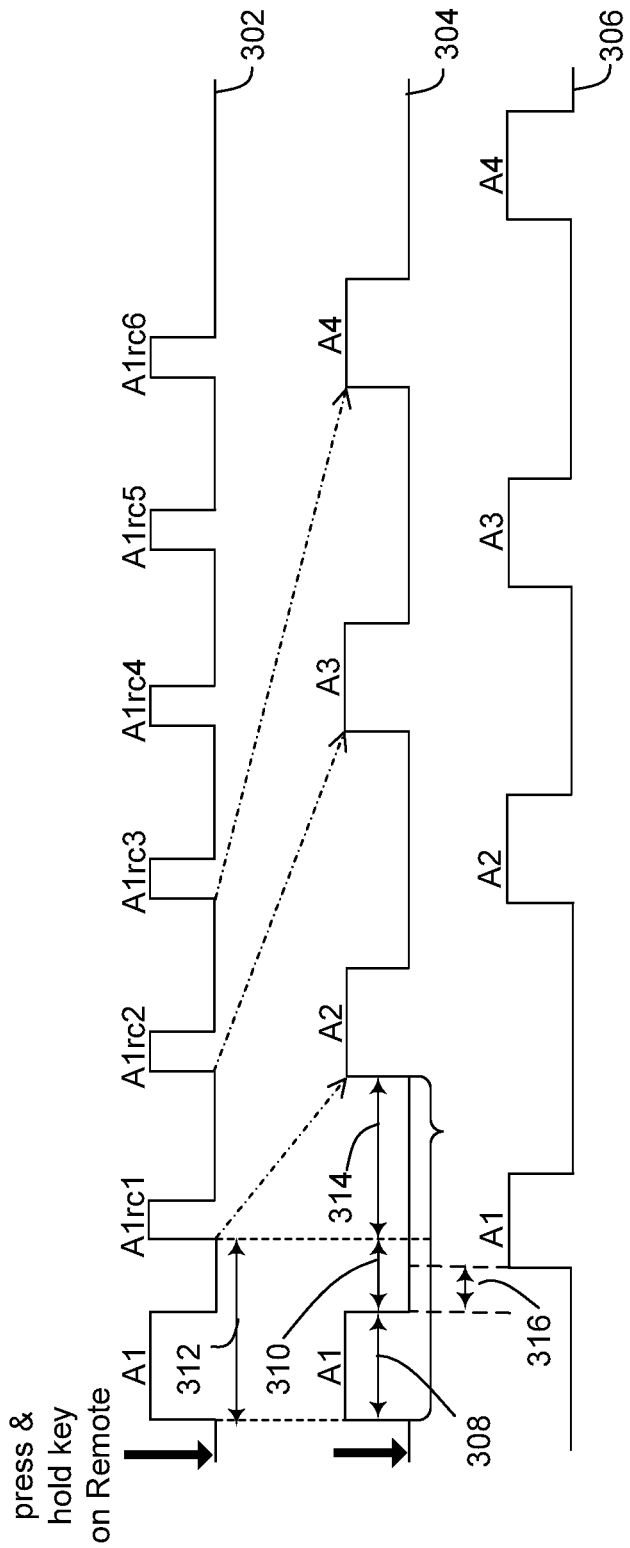
FIG. 3 illustrates exemplary communication protocols, consistent with some implementations of the present concepts.

FIG. 3 illustrates several exemplary infrared protocols discussed more below. Generally, protocols 302 and 304 can be implemented by remote control 102 and protocol 306 can be implemented by console 104.

FIG. 3 shows a protocol 302 that can be used directly between the display 106 and a remote control specifically configured for the display (not shown in FIG. 1). When the user presses and holds a key, e.g., volume up, volume down, fast forward, rewind, channel up, channel down, etc., the first packet A1 identifies the specific key that has been depressed. Thereafter, repeat commands can be transmitted at periodic intervals by the remote, shown in FIG. 3 as A1rc1, A1rc2, and so on. Each repeat command may use relatively less bandwidth than the initial command A1.

When an intermediary device such as console 104 is used to translate commands between remote control 102 and display 106, protocol 302 may prove unsatisfactory. Generally, this can occur when the repeat commands are generated by the remote control in relatively quick succession, e.g., because the repeat commands may have are relatively few bits and thus take less time to transmit than longer commands that precede them. Quickly retransmitting small commands in this manner can cause interference issues when using an intermediary device for protocol translation, e.g., the repeat commands generated by the remote control may place the display into a non-detecting state and the display may still be non-responsive when the translated packets are transmitted by the console. For example, if the console transmits a translated command in the second protocol after receiving a repeat command in the first protocol, the display may still be in the non-detecting state when the translated command is sent by the console.

One way to mitigate this issue is to configure the remote control 102 to implement remote protocol 304 instead of protocol 302. In this configuration, the remote control does not transmit repeat commands when the user continues to depress a particular button. Instead, the remote control retransmits the initial command multiple times in a row. For example, instead of transmitting {A1, A1rc1, A1rc2, A1rc3} in sequence, the remote control can transmit {A1, A2, A3, A4} in sequence as the user continues to depress the volume up button. In this example, A1, A2, A3, etc., each represent a full volume up command, whereas A1rc1, A1rc2, etc., represent repeat commands that refer back to the initial A1 in protocol 302.

Comparing protocol 302 to protocol 304, note the following. As discussed above, both protocols can be used to transmit commands by a remote control. In FIG. 3, transmission interval 308 represents the amount of time to transmit a full command (e.g., a volume up command) and empty space interval 310 represents an empty space that follows transmission interval 308 where no transmitting occurs by the remote control 102. Collectively, transmission interval 308 and space interval 310 constitute a full communication interval 312.

In protocol 304, space interval 310 is followed by an additional guard interval 314, whereas protocol 302 omits the guard interval. Said differently, the remote control 102 immediately transmits a repeat message A1rc1 after each regular transmission interval 312 in protocol 302, but adds the guard interval in protocol 304. The addition of the guard interval by the remote control between each successive command A1, A2, etc., has the effect of spreading out each command in time. This can allow the display 106 additional time to complete processing of commands in the first protocol that the display detects but cannot decipher. In some cases, guard interval 314 can thus allow the display to exit the non-detecting state, and begin listening again for the retransmitted, translated signals provided by the console 104.

However, even using guard interval 314 as discussed above, the console 104 can rebroadcast signal 110 too soon after receiving signal 108 from remote control 102. As a consequence, the display 106 may still be in the non-detecting state when the console transmits signal 110. Thus, in some implementations, the console 104 may add a delay before rebroadcasting signal 110. FIG. 3 shows a protocol 306 implemented by the console that shows this delay 316. This delay may be implemented by using a timer (e.g., a software timer or a hardware timer) after receiving each command from the remote control before retransmitting to the display.

To summarize, protocol 302 and 304 represent different protocols that can be implemented by remote control 102, and protocol 306 represents a protocol that can be implemented by the console 104. For convenience and clarity, the examples herein may use the term "remote control protocol" to refer to 304 and "controlled device protocol" to refer to protocol 306. However, as used in the claims, these terms are not limited to the specific protocol examples discussed herein.

Example Console Components

Figure 4:
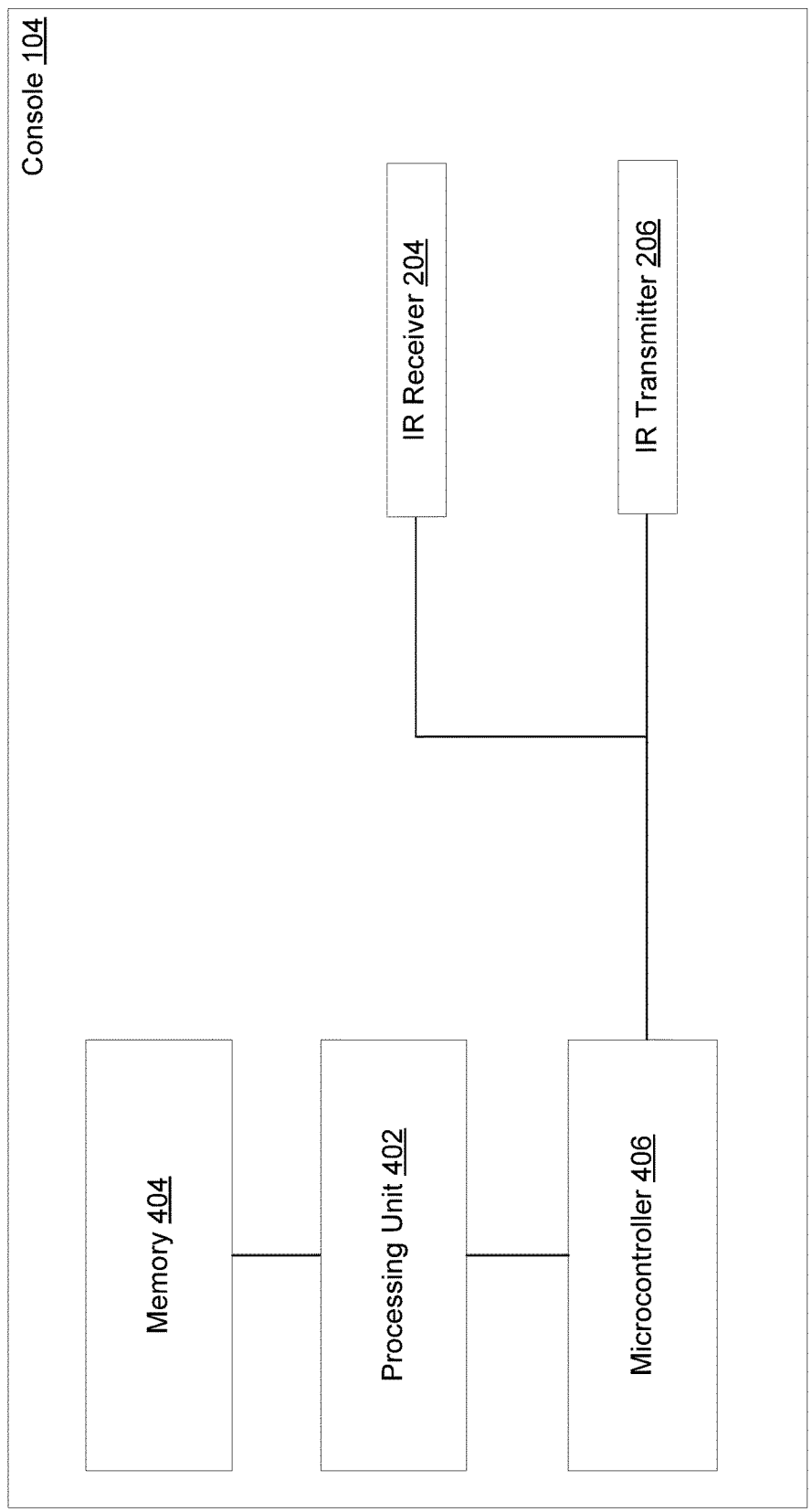

FIG. 4 shows a general view of components that can be provided in console 104. As shown in FIG. 4, console 104 can include IR receiver 204 and IR transmitter 206, as already shown in FIG. 2. Also, console 104 can include a processing unit 402, a memory 404, and a microcontroller 406. Generally, the memory can include instructions that are executed by the processing unit to perform various functionality discussed herein, such as logically decoding infrared packets received from the remote control 102 in a first protocol and translating commands identified in the packets into a second protocol. The microcontroller 406 can directly control the IR receiver and IR transmitter responsive to communications received from the processing unit, e.g., over one or more internal buses. The microcontroller can also implement delay interval 316 via a timer, and provide the translated packets to the IR transmitter after the timer expires. Generally, the IR receiver can convert received infrared signal 108 into a series of logical bits in the first protocol for processing by the processing unit. Similarly, the IR transmitter can convert another series of logical bits provided by the processing unit into transmitted infrared signal 110.

Figure 5:
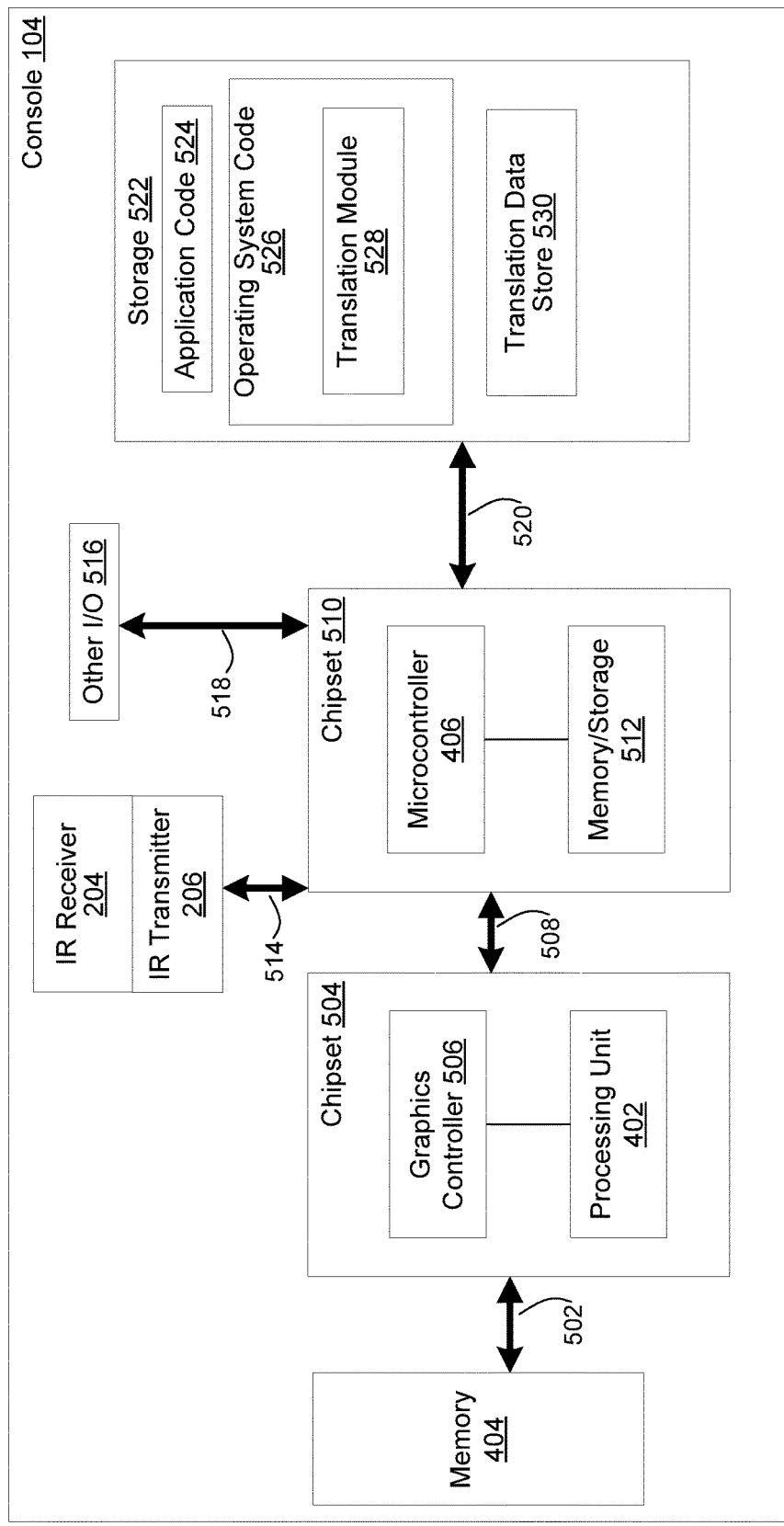

FIG. 5 shows a more specific configuration of console 104. In FIG. 5, console 104 is provided with memory 404 connected to a memory bus 502. Memory bus 502 can connect to chipset 504, which can include a graphics controller 506 (e.g., a graphics processing unit or GPU) and processing unit 402, introduced above in FIG. 4. For example, the graphics controller and processing unit can access the memory via the memory bus.

Chipset 504 can also communicate using a chipset bus 508 with chipset 510, which can include microcontroller 406 (FIG. 4) and memory/storage 512. For example, memory/storage 512 can include volatile and/or non-volatile memory (e.g., RAM, flash, etc.) storing instructions such as microcontroller firmware. These instructions can generally control the microcontroller's processing, as discussed more herein.

Chipset 510 can communicate with IR receiver 204 and IR transmitter 206 using a transmitter/receiver bus 514. In addition, chipset 510 can communicate with various other I/O devices 516 using I/O bus 518. For example, I/O devices 516 can be controlled using a network controller, a universal serial bus (USB) controller, a high definition multimedia interface (HDMI) controller, a peripheral component interconnect (PCI) controller, a media device controller (e.g., Blu-ray, DVD, CD, etc.).

Chipset 510 can also communicate over a storage bus 520 with storage 522, such as a flash drive, a magnetic hard disc drive (HDD), etc. For example, the storage bus can be a parallel or serial ATA bus. The storage can include various modules and data that can be read over the storage into memory 404 for processing by the processing unit 402 and/or graphics controller 506.

In some implementations, storage 522 can include application code 524. In the case of a gaming console, the application code can include one or more executables of games stored locally on storage. Note, however, that such executables may often be obtained via a network and/or removable media (CD, DVD, Blu-ray, etc.). Application code 524 can also include various higher-level functionality such as television programming functionality, user log-in and gamer profile maintenance, etc.

Storage 522 can also include operating system code 526. The operating system code can perform various functionality such as providing low-level device drivers for various connected devices, management of threads, memory, and storage, providing various application programming interfaces (APIs) used by application code 524, etc. Operating system code 526 can include a translation module 528 that can translate commands between different protocols, e.g., such as commands received via IR receiver 204.

Storage 522 can also include a translation data store 530. For example, the translation data store can include a lookup table for converting various commands received via IR receiver 204 into other commands that are transmitted by IR transmitter 206.

Network Scenario

Figure 6:
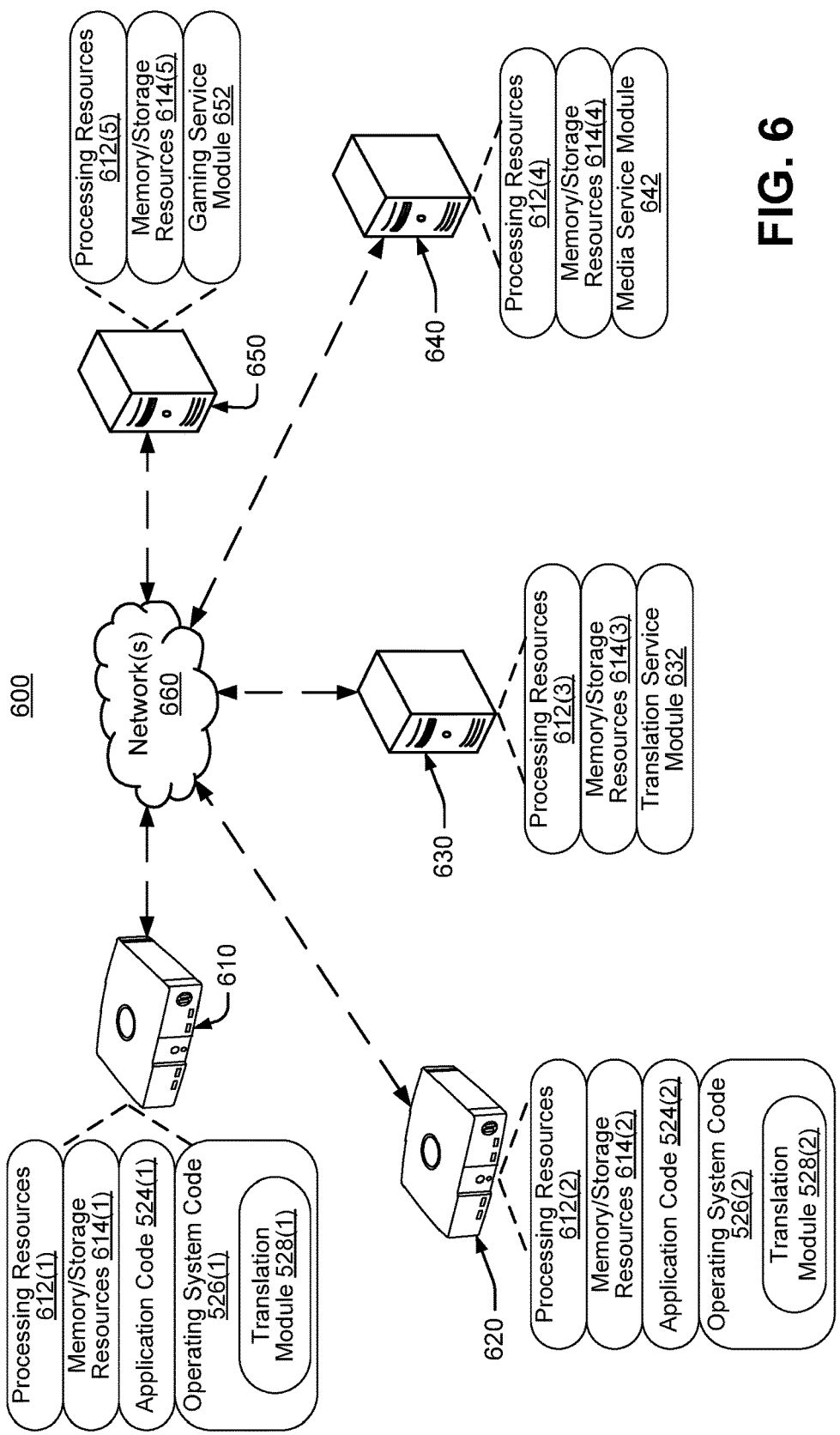

The disclosed implementations can be performed in various scenarios, including locally on a single computing device as well as in networked or cloud scenarios. FIG. 6 shows an example environment 600 including various computing devices including a console 610, a console 620, a protocol translation server 630, a media service server 640, and a gaming service server 650, connected by a network 660. Note that the names of the computing devices 610-650 are for convenience and merely refer to logical roles performed by these computing systems in the examples discussed herein.

Certain components of the computing systems 610-650 may be referred to herein by parenthetical reference numbers. For the purposes of the following description, parenthetical reference (1) indicates an occurrence of a given component on console 610, (2) indicates an occurrence on console 620, (3) indicates an occurrence on protocol translation server 630, (4) indicates an occurrence on media service server 640, and (5) indicates an occurrence on gaming service server 650. Unless identifying a specific instance of a given component, this document will refer generally to the components of the computing devices without the parenthetical.

Generally, each of the computing devices 610-650 may have respective processing resources 612 and memory/storage resources 614, which are discussed in more detail below. The various computing systems may also have various modules that function using the processing and memory/storage resources to perform the techniques discussed herein, as also discussed more below. In the case of consoles 610 and 620, processing resources can include processing unit 402, graphics controller 506, and microcontroller 406 (FIGS. 4 and 5). Likewise, the memory/storage resources for consoles 610 and 620 can include memory 404, memory/storage 512, and storage 522.

As previously discussed, consoles 610 and 620 can have application code 524 as well as operating system code 526. Operating system code 526 can include translation module 528. In some cases, the operating system code can request translation data from the protocol translation server 630 over network 660. Translation service module 632 on the translation service server can send a requested translation data set to the console, and the translation data set can be stored in the translation data store 530 on the console.

The consoles 610 and 620 can also access the media service server 640. For example, the media service server can include a media service module 642 that can send media data to the requesting console. For example, the media can include television programming, music, videos, etc. In some cases, the media can also include video game code that is executable on the console.

The consoles 610 and 620 can also access the gaming service server 650. For example, the gaming service server can include a gaming service module 652 that can maintain a user profile for the user of each console. The gaming service module can also handle networked gaming scenarios, e.g., by communicating game state information (e.g., controller inputs) between consoles 610 and 620 when the users of the respective consoles are playing an online game together. The gaming service module can also maintain user achievements, preferences, and configuration information for each user and/or each console.

From the perspective of consoles 610 and/or 620, the protocol translation server 630, media service server 640, and/or gaming service server 650 can be considered network resources. Note, however, that a "network resource" could also refer to other types of resources accessible over a network. For example, a network resource could be a peer device such as another console or any other user device (e.g., a tablet, mobile phone, personal computer, etc.), a network-accessible storage device, etc.

First Method Example

Figure 7:
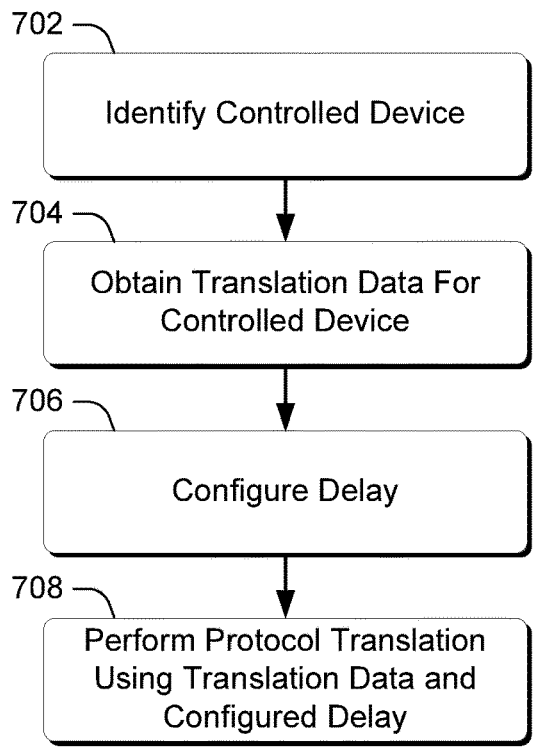
FIGS. 7 and 8 illustrate exemplary methods or techniques, consistent with some implementations of the present concepts.

FIG. 7 illustrates processing that can be performed in some implementations. For example, method 700 is discussed below in the context of being implemented by the console 104, but in other scenarios can be performed by various other types of computing devices.

Block 702 can identify a device that will be controlled by translated commands, such as a display, an audio device, a projector, etc. In some cases, the intermediary device performing the translation (e.g., console 104) can determine an identity (e.g., type of device, brand, model, etc.) of the controlled device by communicating directly with the controlled device. For example, in the examples above, the console may be connected to a display by an HDMI cable, and can use the HDMI interface to detect the type of display. As another example, the console can receive a direct user input, perhaps from the remote control 102, identifying the type of device that will be controlled. In still further cases, the console can contact the gaming service server 650 to access the user's profile. The user's profile may identify the type of controlled device that the user has at home.

Block 704 can obtain translation data for the controlled device. For example, the console 104 can contact the translation service server 630 and receive translation data. In some cases, the console can send an identifier of the controlled device to the translation service server, and receive a subset of translation data for the specific device that will be controlled. In other cases, the console can obtain a full data set suitable for translating commands for a variety of different devices. The console can then select a specific subset of command translations for the particular device that is being controlled.

Block 706 can configure a delay for communicating with the controlled device. For example, the delay can be a universal delay that can accommodate various types of controlled devices. In other cases, the delay may be configurable according to the characteristics of the device that is being controlled. In some cases, the delay is static, e.g., determined before doing translation functionality and does not change when the device is being controlled. In other cases, the delay can be adaptively configured depending on various other criteria, as will be discussed more below.

Block 708 can perform protocol translation using the translation data and the configured delay, as discussed elsewhere herein.

Second Method Example

Figure 8:
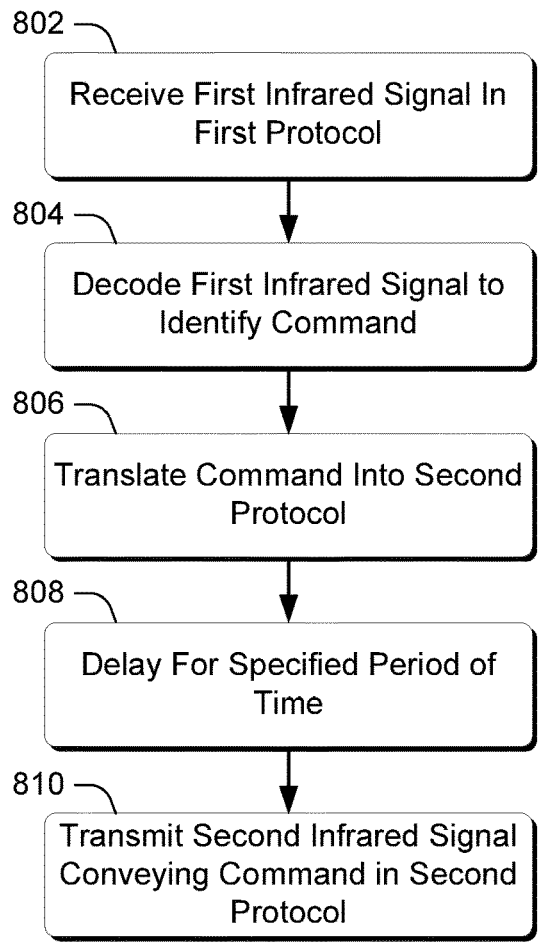

FIG. 8 illustrates processing that can be performed in some implementations. For example, method 800 can be implemented by the console 104 or another computing device. From one perspective, method 800 can be viewed as part of method 700, in particular, block 708 of method 700.

Block 802 of method 800 can receive a first signal in a first protocol. As discussed above, the first signal can be in an infrared protocol such the NEC protocol ("protocol 302" in FIG. 3), a modified variant thereof (e.g., "protocol 304" in FIG. 3), or another type of signal such as a radio signal, visible light, ultraviolet, sound, etc. The first signal can include a first packet that identifies a command. For example, as discussed herein, the command can be a command requesting that the display or another device change volume, brightness, contrast, a channel, a menu option, etc.

Block 804 of method 800 can decode the first signal to obtain the first packet and extract the command conveyed by the first signal. For example, as discussed elsewhere herein, the console 104 can perform the decoding using IR receiver 204 and microcontroller 406.

Block 806 of method 800 can translate the command into a second protocol, e.g., a protocol understood by the display 106. Block 806 can, in some cases, include the command in a second packet that conforms to the second protocol. The translation can be performed using translation data, as discussed elsewhere herein. For example, as discussed elsewhere herein, the console 104 can translate the command and generate the second packet using operating system code 526 executing on processing unit 402.

Block 808 can delay for a specified period of time, e.g., by initiating a timer and waiting for the timer to expire. The delay can be configured using various techniques, as discussed elsewhere herein. As noted above, the delay can be implemented by microcontroller 406, e.g., as controlled by firmware stored on memory/storage 512.

Block 810 can transmit a second signal that includes the second packet responsive to expiration of the timer. For example, the second signal can be transmitted by the microcontroller 406 controlling the IR transmitter 206 to output a set of logical bits provided in the packet received from the operating system.

Inter-Console Communications

As noted above, some implementations may use multiple processing resources within console 104. FIG. 5 sets forth an example processing unit 402 and microcontroller 406. In some implementations, processing unit 402 can be configured via operating system code 526 and application code 524. Microcontroller 406 can be a dedicated circuit that be configured via firmware.

Some implementations may perform certain functionality on the processing unit 402, e.g., using operating system code 526, and other functionality on the microcontroller 406, e.g., by executing the firmware. For example, the operating system code can identify the controlled device as discussed elsewhere herein, e.g., via a user input, user profile, HDMI interface, etc. The operating system code can also obtain, store, and manage translation data for the controlled device.

Upon receiving a new command from the remote control 102, the microcontroller 406 can determine how to process the new command. Some commands, such as commands intended for the console 104 and not necessarily to control the display 106, may be handled by the microcontroller. For example, if the command is an on command, off command, eject command, and/or standby command, the microcontroller may parse the incoming command and handle these commands directly on the microcontroller. The microcontroller may assert one or more local signals that instruct the console to turn on, off, eject a disc, and/or enter a standby mode.

Other received commands may be intended to control the display 106, such as volume up or down, channel up or down, etc. However, as noted, the display may not natively understand commands communicated by the remote control 102. These commands may be identified by the microcontroller 406 as being commands that are handled by the operating system code 526. The operating system code and microcontroller firmware may communicate by a messaging system over chipset bus 508, and the microcontroller can send messages identifying these commands to the operating system using the messaging system.

Upon receipt of a command needing translation, the operating system code 526 can translate the command as discussed elsewhere herein, e.g., using translation data stored locally or obtained over a network. The operating system can send another message back to the microcontroller 406 with the translated command. Upon receipt of the translated command, the microcontroller can then delay for a specified period of time before transmitting the translated command to the display using IR transmitter 206.

Delay Considerations

Referring back to FIG. 3, recall that delay 316 can be implemented by the console 104. This delay can allow the display 106 to perform the following: (1) detect a first packet transmitted by the remote control 102 in a first protocol, (2) detect that the first packet is not in the second protocol used by the display, (3) transition to a non-detecting state for a period of time, and (4) recover to a detecting state before receiving a second, translated packet from the console that is in the second protocol. In some cases, delay 316 can be deterministic or non-deterministic, as discussed more below.

During delay 316, the console 104 may perform some operating system processing, such as packet translation, and the microcontroller 406 may perform some additional processing, e.g., initiating a countdown counter that is set to a specified period of time and then transmitting translated packets upon expiration of the timer. There are various considerations that can be useful for configuring the duration of the delay by the microcontroller after receiving the translated command from the operating system. These considerations can include the amount of time the operating system takes to perform translation processing, the amount of time it takes the display 106 to recover to a non-detecting state, and the amount of time it takes before the remote control 102 transmits a subsequent command if the user holds a given command input, e.g., the time between A1, A2, and A3 shown in protocol 304.

Consider first the amount of time it takes the display 106 to recover to a detecting state after detecting a command transmitted by the remote control 102. In some cases, the console 104 and the remote control may be compatible with one another, e.g., made by the same manufacturer or otherwise intended to be used with one another. The console manufacturer may wish to allow the user of the console to control various different displays from other manufacturers with the remote control for the console, e.g., to allow the user to control both the console and the display with a single remote control. Different display manufacturers may implement different protocols, and these displays may take different amounts of time to recover after receiving a malformed packet.

Assume, for the purposes of the following examples, that a television A made by manufacturer A takes 300 milliseconds to recover after detecting a malformed packet. In other words, as long as delay 316 is at least 300 milliseconds, the console 104 can safely retransmit a translated packet and expect television A to properly handle the packet. Further, assume television B made by manufacturer B takes 450 milliseconds to recover after detecting a malformed packet. In other words, delay 316 needs to be at least 450 milliseconds in order for the console to safely retransmit a translated packet and expect television B to properly handle the packet.

One way to handle this scenario is for the console 104 to use a single delay 316 irrespective of the television involved. In the example above, since television B takes the longest to recover, the console 104 can use a 450 millisecond delay for both television A and television B. This will work for television A because television A recovers in less time than television B.

Note that delay 316 has multiple components, e.g., the operating system processing time and the microcontroller processing time. Either component can be non-deterministic, but particularly the duration of the operating system translation processing time. For example, some commands may take more time to translate than other commands. In addition, the operating system processing time may be impacted by resource utilization issues, e.g., the processing unit 402 may have one or more cores that are busy at some times and not as busy at other times. For the following examples, assume that the longest the operating system processing time can take is 300 milliseconds, and the shortest the operating system time can take is 200 milliseconds. Further, assume the microcontroller time, with the exception of intentional delay added by the microcontroller, is negligible and assumed to be essentially instantaneous for the following examples. In practice, the microcontroller may take 1-5 milliseconds to perform its processing.

In this example, one way to ensure that delay 316 is at least 450 milliseconds would be to configure a microcontroller delay of 250 milliseconds. Since the operating system takes at least 200 milliseconds to perform its translation processing, this means that, at a minimum, the total delay will be at least 450 milliseconds, which can accommodate both television A and television B.

Consider now the timing of the remote control. Referring back to protocols 302 and 304, recall that, in both protocols, the remote control waits for empty space interval 310 after transmitting a command and before transmitting a subsequent command. In protocol 304, a guard interval 314 is added by the remote control 102 to allow the television time to recover before transmitting the next command.

If the guard interval 314 is too short, the remote control 102 might retransmit the next command while the console 104 is also transmitting a translated command. Thus, the guard interval may be configured so that this does not occur. For example, assume transmission interval 308 is 200 milliseconds, and space interval 310 is 50 milliseconds. In other words, the standard remote control protocol takes 250 milliseconds between each command. But, continuing with the example, the console 104 will take at least 450 milliseconds to retransmit a command and potentially as long as 550 milliseconds. In this case, a guard interval of 300 milliseconds can be used by the remote control to allow the console to complete translation processing before the remote control transmits another command.

In further implementations, the delay interval 316 can be adjusted to accommodate different operating system processing times. For example, the operating system may maintain a model of translation processing times to resource utilization. The model may take into account core utilization as well as memory and/or storage utilization, or other resources that may impact the translation processing times. As a simple example, assume that the translation time takes 200 milliseconds when core utilization is under 50%, 250 milliseconds when core utilization is between 51-75%, and 300 milliseconds when core utilization exceeds 75%. Given the 450 millisecond constraint for television B mentioned above, this could imply the microcontroller delay would be 250 milliseconds when the core utilization is under 50%, 200 milliseconds when core utilization is between 51-75%, and 150 milliseconds when core utilization exceeds 75%.

These adjustable delays can be implemented in various ways. One mechanism is for the operating system to calculate the microcontroller delay for each translation, and convey that information to the microcontroller over chipset bus 508. Another mechanism could be for the processor to output the core utilization over the chipset bus, and the microcontroller firmware could map core utilization to delay specifications. In this example, a firmware update could be used to change the delay settings for different core utilizations.

In still further implementations, the console 104 can implement different delays for different devices. For example, if the operating system code 526 detects that the console is controlling television A instead of television B, the console may use different delays. In the example above, television A takes 300 milliseconds to recover after a malformed packet, and the minimum operating system delay is 200 milliseconds. Thus, the microcontroller can use a delay of 100 milliseconds for each command to ensure that the television recovers before the console retransmits a translated packet. If adjustable delays are provided based on core utilization as discussed above, the microcontroller delay timer could be set to 100 milliseconds when the core utilization is under 50%, 50 milliseconds when the core utilization is between 51 and 75%, and 0 milliseconds when the core utilization exceeds 75%.

Device Implementations

Referring back to FIG. 1, system 100 as shown includes several devices. In this case, for purposes of explanation, the devices are introduced as a remote control 102, console 104, and display 106. However, these are mere examples and the disclosed implementations can be performed by various types of computing devices. For example, any of the remote control, console, and/or display can be implemented instead using a desktop computer or a mobile computing device such as a smartphone, tablet, or laptop device, a peripheral device such as a printer, scanner, or access point, a computing-enabled home appliance, a wearable and/or augmented reality device, etc. Generally, so long as a device has some computational hardware and capability for communication using a protocol, the device can be employed consistently with the disclosed implementations.

For example, some implementations may use a remote control to communicate with a console to control an audio receiver or whiteboard instead of a display. In other implementations, the remote control could be replaced by a mobile computing device or a wearable device to communicate with the console to control the display, receiver, and/or whiteboard. As another example, the console could instead be a stationary or mobile computing device that acts as an intermediary in a manner similar to the console discussed above. Note also that these are mere examples and many other combinations of device types are contemplated.

The term "device," "computer," or "computing device" as used herein can mean any type of device that has some amount of hardware processing capability and/or hardware storage/memory capability. Processing capability can be provided by one or more hardware processors (e.g., hardware processing units/cores) that can execute computer-readable instructions to provide functionality. Computer-readable instructions and/or data can be stored on storage, such as storage/memory.

Storage and/or memory can be internal or external to a computing device. The storage can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some cases, computing devices are configured with a general purpose processor and a separate microcontroller. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor" as used herein can also refer to central processing units (CPUs), graphical processing units (GPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Also note that the devices described herein can function in a stand-alone or cooperative manner to implement the described techniques. For example, the methods described herein can be performed on a single computing device and/or distributed across multiple computing devices that communicate over network(s) 660. Without limitation, network(s) 660 can include one or more local area networks (LANs), wide area networks (WANs), the Internet, a peer-to-peer connection or overlay, and the like. Also, note that network(s) 660 can be wired or wireless or any combination thereof.

Any of the devices described herein can have various mechanisms for input and/or output. For example, such devices can have keypad input mechanisms (e.g., a keyboard), joy sticks, mouse devices, touchscreen input mechanisms, voice recognition functionality, movement sensing devices (such as accelerometers, gyroscopes, etc.), body pose tracking mechanisms (such as the Kinect™ device produced by Microsoft® Corporation of Redmond, Wash.), electrodermal input mechanisms, physiological input mechanisms, and so on. The outputs can be proved to one or more output devices, including displays, speakers, printers, haptic output devices, hologram-generating devices, etc.

Also, as noted above, some implementations may employ signaling technologies other than infrared light. In cases where radio frequencies are used, IR receiver 204 and IR transmitter 206 can instead be provided as a radio transmitter and receiver, respectively. Likewise, in cases where sound is employed, acoustic transmitters and receivers can be provided. In a similar manner, appropriate transmission and reception hardware can be provided for optical technologies such as visible light, ultraviolet, laser, etc.

Additional Examples

Various device examples are described above. Additional examples are described below. One example includes a computing device comprising an infrared receiver, an infrared transmitter, a processing unit configured to execute an operating system, and a microcontroller. The microcontroller is configured to receive a first command in a first protocol via the infrared receiver and provide the first command to the operating system. The operating system is configured to obtain the first command from the microcontroller, translate the first command into a translated second command in a second protocol, and provide the translated second command to the microcontroller. The microcontroller is further configured to delay for a specified period of time after receiving the translated second command from the operating system, and after expiration of the specified period of time, control the infrared transmitter to transmit the translated second command.

Another example can include any of the above and/or below examples where the operating system is further configured to determine an identity of a controlled device to be controlled by the translated second command, and to determine the second protocol based at least on the identity of the controlled device.

Another example can include any of the above and/or below examples where the operating system is further configured to access a network resource to obtain translation data for translating from the first protocol to the second protocol, store the translation data locally on the computing device, and use the translation data to translate the first command into the translated second command.

Another example can include any of the above and/or below examples where the computing device further comprises a single infrared window shared by the infrared receiver and the infrared transmitter.

Another example can include any of the above and/or below examples where the single infrared window comprises less than 5 square inches.

Another example can include any of the above and/or below examples where the single infrared window comprises one square inch or less.

Another example can include any of the above and/or below examples where the single infrared window includes an infrared bandpass filter.

Another example can include any of the above and/or below examples where the first command is conveyed by a first infrared signal generated by a remote control, the second translated command is conveyed by a second infrared signal generated by the computing device, and the second infrared signal generated by the computing device is at least 10 times stronger than the first infrared signal generated by the remote control.

Another example can include any of the above and/or below examples where the second infrared signal is at least 0.5 watts.

Another example can include any of the above and/or below examples where the second infrared signal is approximately 0.5 watts.

Another example can include a computing device comprising a receiver, a transmitter, processing resources, and memory or storage resources. The memory or storage resources store instructions which, when executed by the processing resources, cause the processing resources to receive, via the receiver, a first packet encoded in a first protocol. The first packet identifies a command, translates the first packet into a second packet identifying the command in a second protocol, initiates a timer, and responsive to expiration of the timer, causes the transmitter to transmit the second packet.

Another example can include any of the above and/or below examples where the computing device is embodied as a gaming console.

Another example can include any of the above and/or below examples where the instructions, when executed by the processing resources, cause the processing resources to determine an identity of a controlled device and select the second protocol based at least on the identity of the controlled device, where the first protocol is not natively understood by the controlled device.

Another example can include any of the above and/or below examples where the controlled device is a display and the second packet encodes an instruction to the display to change at least one of a volume of the display, a brightness, color, or contrast of the display, a channel shown on the display, or rewind or fast forward media content being shown on the display.

Another example can include any of the above and/or below examples where the transmitter is an infrared transmitter pointed at a downward angle relative to a horizontal plane defined by at least one surface of the computing device.

Another example can include any of the above and/or below examples where the transmitter is a radio or infrared transmitter and the receiver is a radio or infrared receiver.

Another example can include a method comprising identifying a controlled device. The controlled device has a controlled device protocol for controlling the controlled device. The method further comprises obtaining translation data for the controlled device. The translation data conveys translations of commands from another protocol into the controlled device protocol. The method further comprises configuring a delay for transmitting the translated commands and performing translation between the another protocol and the controlled device protocol using the translation data and the configured delay.

Another example can include any of the above and/or below examples where configuring the delay is based at least on a period of time during which the controlled device ceases detection of commands.

Another example can include any of the above and/or below examples where the period of time occurs after the controlled device receives an individual command in the another protocol.

Another example can include any of the above and/or below examples where the method further comprises configuring the delay based at least on a duration of translation processing from the another protocol to the controlled device protocol.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims, and other features and acts that would be recognized by one skilled in the art are intended to be within the scope of the claims.

The invention claimed is:

1. A computing device comprising:
an infrared receiver;
an infrared transmitter;
a processing unit configured to execute an operating system; and
a microcontroller configured to:
  receive a first command in a first protocol via the infrared receiver; and
  provide the first command to the operating system, the operating system being configured to:

obtain the first command from the microcontroller;
translate the first command into a translated second command in a second protocol; and
provide the translated second command to the microcontroller, the microcontroller being further configured to:
delay for a specified delay period after receiving the translated second command from the operating system; and
after expiration of the specified delay period, control the infrared transmitter to transmit the translated second command to a controlled device,
the specified delay period being based at least on a non-detection period during which the controlled device ceases detection of commands, and
the specified delay period occurring after the controlled device receives the first command in the first protocol.

2. The computing device of claim 1, wherein the operating system is further configured to:
determine an identity of the controlled device to be controlled by the translated second command; and
determine the second protocol based at least on the identity of the controlled device.

3. The computing device of claim 2, wherein the operating system is further configured to:
access a network resource to obtain translation data for translating from the first protocol to the second protocol;
store the translation data locally on the computing device; and
use the translation data to translate the first command into the translated second command.

4. The computing device of claim 1, further comprising a single infrared window shared by the infrared receiver and the infrared transmitter.

5. The computing device of claim 4, wherein the single infrared window comprises less than 5 square inches.

6. The computing device of claim 4, wherein the single infrared window comprises one square inch or less.

7. The computing device of claim 4, wherein the single infrared window includes an infrared bandpass filter.

8. The computing device of claim 7, wherein the first command is conveyed by a first infrared signal generated by a remote control, the second translated command is conveyed by a second infrared signal generated by the computing device, and the second infrared signal generated by the computing device is at least 10 times stronger than the first infrared signal generated by the remote control.

9. The computing device of claim 8, wherein the second infrared signal is at least 0.5 watts.

10. The computing device of claim 8, wherein the second infrared signal is approximately 0.5 watts.

11. The computing device of claim 1, the non-detection period occurring when the controlled device interprets the first command as a malformed communication.

12. A computing device comprising:
a receiver;
a transmitter;
processing resources; and
memory or storage resources storing instructions which, when executed by the processing resources, cause the processing resources to:
receive, via the receiver, a first packet encoded in a first protocol, the first packet identifying a command;
translate the first packet into a second packet identifying the command in a second protocol, the second protocol being used by a controlled device;
initiate a timer to a value that is based at least on a period of time during which the controlled device ceases detection of commands, the period of time occurring after the controlled device receives the first packet encoded in the first protocol; and
responsive to expiration of the timer, cause the transmitter to transmit the second packet.

13. The computing device of claim 12, embodied as a gaming console.

14. The computing device of claim 12, wherein the instructions, when executed by the processing resources, cause the processing resources to:
determine an identity of the controlled device; and
select the second protocol based at least on the identity of the controlled device, wherein the first protocol is not natively understood by the controlled device.

15. The computing device of claim 14, wherein the controlled device is a display and the second packet encodes an instruction to the display to change at least one of a volume of the display, a brightness, color, or contrast of the display, a channel shown on the display, or rewind or fast forward media content being shown on the display.

16. The computing device of claim 12, wherein the transmitter is an infrared transmitter pointed at a downward angle relative to a horizontal plane defined by at least one surface of the computing device.

17. The computing device of claim 12, wherein the transmitter is a radio or infrared transmitter and the receiver is a radio or infrared receiver.

18. A method comprising:
identifying a controlled device, the controlled device having a controlled device protocol for controlling the controlled device;
receiving a command in another protocol;
translating the received command into the controlled device protocol using translation data to obtain a translated command, the translation data conveying translations of various commands from another protocol into the controlled device protocol; and
delaying for a configured delay time before transmitting the translated command, the configured delay time being based at least on a period of time during which the controlled device ceases detection of commands, the period of time occurring after the controlled device receives the command in the another protocol.

19. The method of claim 18, further comprising:
determining the configured delay time based at least on a duration of translation processing from the another protocol to the controlled device protocol.

20. The method of claim 19, further comprising:
determining resource utilization of one or more hardware resources used to perform the translating; and
determining the duration of the translation processing based at least on the resource utilization of the one or more hardware resources.

21. The method of claim 18, further comprising:
setting the configured delay time to at least 250 milliseconds.

* * * * *